July 31, 1956  P. C. RENZO  2,756,684
ROTARY GEAR-TYPE PUMP

Filed Nov. 12, 1954  3 Sheets-Sheet 1

INVENTOR
Peter C. Renzo

BY
ATTORNEYS

July 31, 1956  P. C. RENZO  2,756,684
ROTARY GEAR-TYPE PUMP
Filed Nov. 12, 1954  3 Sheets-Sheet 2

INVENTOR
Peter C. Renzo

BY *Lancaster, Allwine Rommel*
ATTORNEYS

July 31, 1956 P. C. RENZO 2,756,684
ROTARY GEAR-TYPE PUMP
Filed Nov. 12, 1954 3 Sheets-Sheet 3

INVENTOR
Peter C. Renzo

BY Lancaster, Allwine Rommel
ATTORNEYS

United States Patent Office 2,756,684
Patented July 31, 1956

2,756,684

ROTARY GEAR-TYPE PUMP

Peter C. Renzo, Paramus, N. J., assignor to Sier-Bath Gear and Pump Co., Inc., North Bergen, N. J., a corporation of New Jersey Application November 12, 1954, Serial No. 468,308

1 Claim. (Cl. 103—216)

This invention relates to rotary gear-type pumps and is particularly well adapted for use in the production of herringbone-gear pumps of the type having self-contained bearings and built for liquids that have lubricating qualities.

The principal objects of the invention are to provide pumps of this type which are low in cost of manufacture, easily assembled and disassembled, and which include separate side plates for confronting relationship with the sides of the pumping gears, fabricated and arranged that the pumps equipped with them will be hydraulically balanced axially, the bearings of the shafts of the pumping gears adequately lubricated and films of oil interposed between the side plates and the sides of their respective pumping gears.

It is common in the art relating to gear pumps to encircle the driving and driven shafts of the intermeshing gears with flanged bushings, which act as bearings for the shafts. These flanged bushings, or some of them, have limited sliding movement in an axial direction on their respective journals and are spring urged into contact with the sides of the gears. In some types of gear pumps, fluid under pressure is utilized to urge these flanged bushings into intimate contact with the sides of the gears. According to the present invention the driving and driven shafts of the intermeshing gears are supported by anti-friction bearings, such as roller bearings of the conventional caged design, and annular side plates, having bores for receiving their respective shafts, replace the bushings of the old type gear pumps. These side plates are constructed and arranged so that, in use, they do not move axially of their respective shafts for it is desired that there be films of liquid between the side faces of the gears and the side plates to prevent metallic contact between them. However the side plates do not have a tight fit in the pump housing, but rather a "free," "medium" or "snug" fit, so they may be placed and removed with respect to bores in the pump housing by hand, and of a nature to permit small quantities of liquid to leak from the outlet port of the pump, through the chambers containing the anti-friction bearings and back into the intake port of the pump. This leakage is the result of superatmospheric pressure at the discharge side of the pump, and to a limited extent, the result of suction at the intake side of the pump while operating.

Another object is to provide side plates of the character described which are of the same size and pattern for a given size pump, thus avoiding the necessity of fabricating side plates of different patterns for each the upper right, upper left, lower right and lower left shaft portions or journals of the intermeshing pumping gears, and to facilitate stocking of repair or replacement side plates.

A further object is to provide rotary gear-type pumps, equipped with side plates associated with the sides of the pumping gears, the casing of each pump being constructed and arranged that when the pump has its drive shaft connected to some prime mover, such as an electric motor, or engine, the removal of a portion of the housing will enable a person to replace the side plates, without disconnecting the drive shaft from its connection with the prime mover.

Other objects will appear in the following detailed description of a practical embodiment of the invention, taken in connection with the accompanying drawings, forming a part of this specification, and in which drawings.

Figure 2:
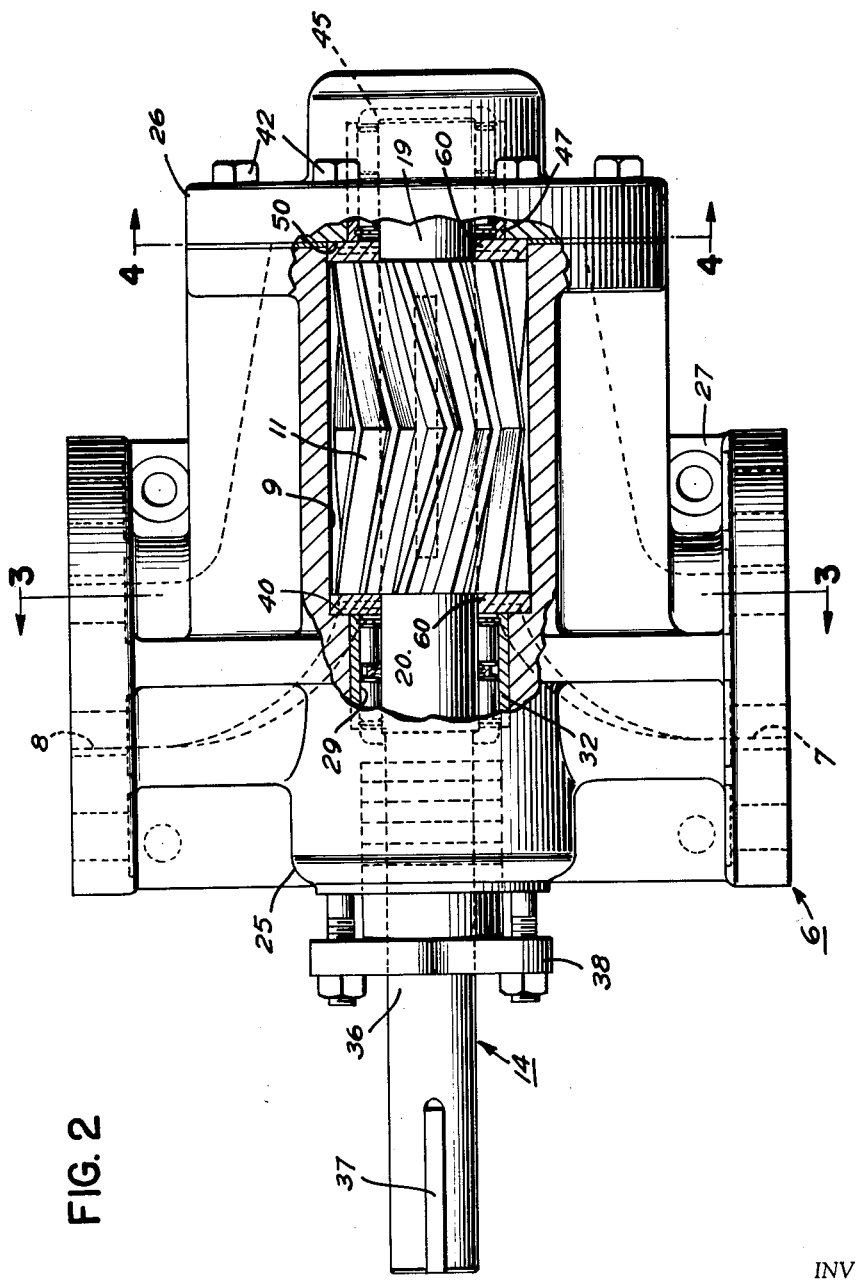
Fig. 2 is a plan view of the pump, portions being broken away to disclose preferred details.
Figure 3:
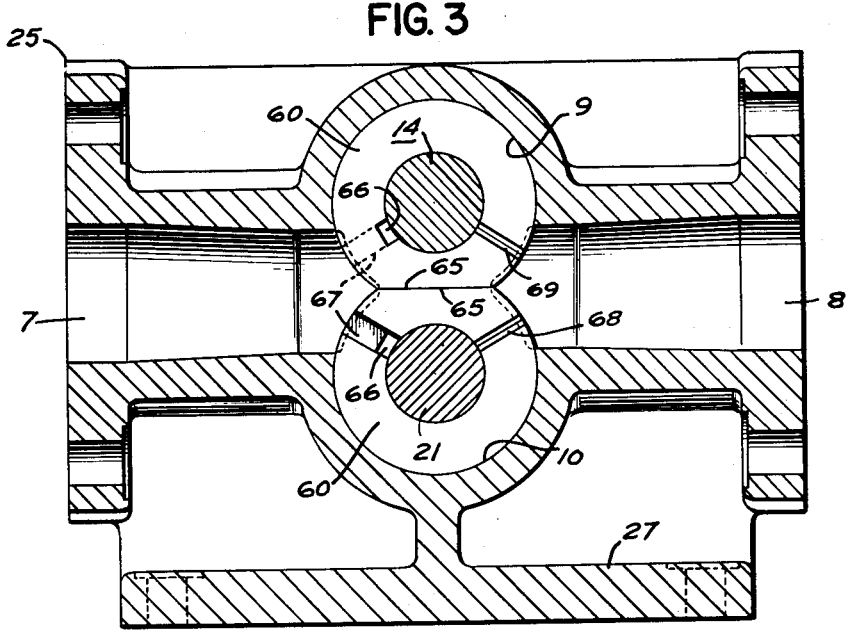
Figure 4:
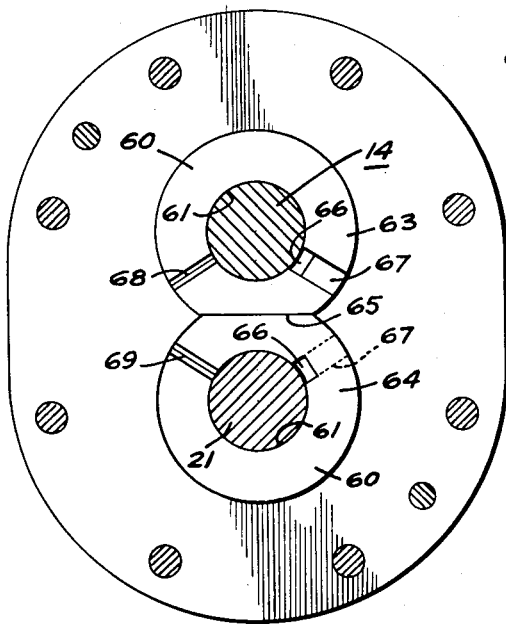

Figs. 3 and 4 are sectional views on the lines 3—3 and 4—4, respectively of Fig. 2.

Figure 5:
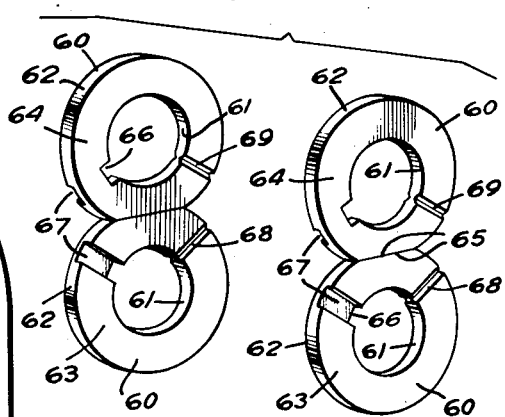

Fig. 5 is a view in perspective of four of the side plates arranged in proper relationship to one another for use in the pump, all being of the same pattern.

The pump comprises a casing 6 provided with an intake port 7 and an opposite outlet port 8, open laterally to parallel intersecting bores 9 and 10; and intermeshing pump gears 11 and 12, of the herringbone-type, in the bores 9 and 10, as is usual in pumps of this type. The gear 11 is the driving gear, located mainly in the bore 9, and is preferably mounted on a drive shaft 14 for rotation therewith, as by a key 15 carried by and extending longitudinally of shaft 14 and projecting into a keyway 16 longitudinally of the driving gear and open at the sides 17 and 18, whereby the gear 11 may be detached from the drive shaft by sliding the gear longitudinally of the shaft. The gear 11 is disposed intermediate the ends of the shaft 14, more toward one end than the other, so that one end portion of the shaft serves as an end journal 19, and another intermediate portion serves as an intermediate journal 20, as hereinafter described. The gear 12 which is the driven gear, is located mainly in the bore 10 and in the example shown has a shrunk fit on a shaft 21, the end portions 22 and 23 of which constitute journals for the gear, as hereinafter described.

The casing 6 preferably comprises a major section 25 and a minor section 26 separable at a plane normal to the axes of the bores 9 and 10.

The major section 25 may be provided with a base portion 27, whereby the pump may be secured in place in the usual or approved manner, and contains the bores 9 and 10, as well as cylindrical bearing chambers 29 and 30 coaxial with and at adjacent ends of the bores 9 and 10, respectively. These chambers receive bearings 32 and 33 for the journal portions 20 and 23, respectively and the chamber 29 has a drive shaft accommodating opening 34, coaxial with the bore 9, for receiving the extended portion 36 of drive shaft 14. The latter may be provided with a key 37 for operatively connecting the shaft with any suitable prime mover, not shown in the drawing. A suitable packing gland 38 located outwardly of the chamber 29 and surrounding the shaft 14, prevents leakage. The chambers 29 and 30 are each preferably of a diameter less than the diameter of its respective gear receiving bore, whereby shoulders 40 and 41 are presented at the ends of bores 9 and 10 in casing section 25.

The minor casing section 26, in the example shown, constitutes an end closure associated with the ends of the bores 9 and 10, opposite the bearing chambers 29 and 30. It may be detachably secured to major section 25, by bolts 42, a suitable packing 43 being disposed between the sections 25 and 26. The section 26 is provided with cylindrical bearing chambers 45 and 46, coaxial with the bores 9 and 10, these chambers receiving bearings 47 and 48 for the journals 19 and 22, respectively. It is also preferred to make the chambers 45 and 46 each of a diameter less than the diameter of its associated gear receiving bore, whereby, when the section 26 is secured in place with respect to section 25, shoulders 50 and 51 are presented at the ends of bores 9 and 10, opposite the shoulders 40 and 41, respectively.

The bearings 32, 33, 47 and 48 are all preferably of the same size and type removably disposed in their respective chambers 29, 30, 45 and 46, respectively, and in the example shown each comprises a plurality of rollers 52 each in line contact with its respective journal, a cage 53 for the rollers and an outer annular race member 54 with which the rollers 52 have line contact at the interior of the member 54. The latter is of a size to have the usual snug fit in its respective cylindrical bearing chamber so the bearing may be readily placed and removed, yet the race member 54 will not rotate during operation of the pump.

The pump gears 11 and 12 are of the same length, so that when they are in the usual intermeshing engagement or relationship, sides 55 and 56 of gear 12 are in the same planes as sides 17 and 18, respectively, of gear 11. The gears 11 and 12 are each of a length appreciably less than the length of their respective bores 9 and 10, so as to permit the interposition of side plates 60 between the sides 17, 18, 55 and 56 of the gears and the adjacent shoulders 40, 50, 41 and 51, respectively of the casing 6.

It is the plates 60 that are so fabricated and arranged in the gear bores 9 and 10 that they, or any one or more of them, may be readily removed in the event of wear or damage and replaced with a new unit; that they permit the liquid having lubricating qualities, moved by the pump, to lubricate the bearings 32, 33, 47 and 48 by some of it circulating in and passing through the chambers 29, 30, 45 and 46, respectively and also hydraulically balancing the pump axially; and that they provide a thin film of the lubricating liquid spread between the confronting faces of the plates 60 and the adjacent side faces of the pump gears.

Figure 1:
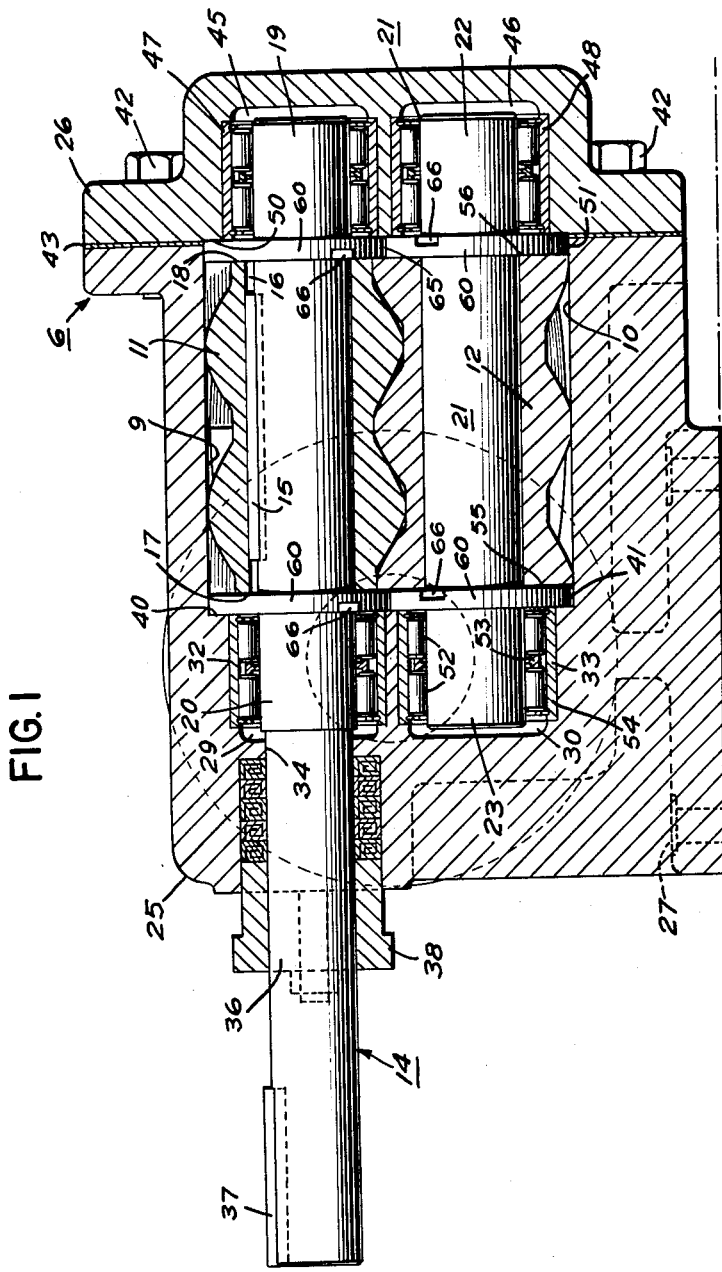
Fig. 1 is a view of the pump, partly in vertical section, longitudinally of the driving and driven shafts, and partly in elevation.

Each plate 60, as perhaps best shown in Fig. 5, is generally speaking, an annular body, having a bore 61 of a diameter for receiving, with free fit, a pump gear journal, and an external diameter so that its annular periphery 62 will have a free, medium or snug fit with the gear receiving bore of the casing 6. The body also has parallel side faces 63 and 64, either of which may be disposed in confronting relation with either side of either pump gear, and a flat chordal peripheral surface 65 for engagement with a like surface of a companion plate 60 disposed in the zone of the area of meshing of the pumping gears as shown in Fig. 1. For the purpose of permitting lubricating fluid which can be forced from the outlet port 8 past the plates 60 into the bearing chambers, to be drawn from the bearing chambers, each plate 60 is provided with a cross passageway 66 open to bore 61 and to the opposite side faces 63 and 64, and a radial passageway 67 open at face 63, to the cross passageway and preferably to the annular periphery 62 adjacent to one end of the chordal peripheral surface 65.

Thus the same size and pattern of side plates may be used at all four locations and the cross passageway 66 located at the intake side of the pump, or, in other words, in communication with the intake or suction port 7 of the pump. This cross passageway 66 is preferably made of a size that it will accommodate the key 15, when the plate is disposed in the upper left hand position as shown in Fig. 1, nearest to the portion of casing 6 where the drive shaft accommodating opening 34 is located, and thus permit placing and removal of the side plate in such location without disturbing the drive shaft 14, just so long as the projecting portion of key 15 is brought into axial alignment with the cross passageway 66 of the plate.

Each side plate 60 is also preferably provided with radial grooves 68 and 69 open to faces 63 and 64, respectively, and open to the bore 61 and the periphery 62 adjacent to the end of chordal peripheral surface 65 opposite that end to which the cross passageway 66 is located, so that either of the grooves 68 or 69 may be disposed at the outlet or pressure side of the pump, for the purpose of depositing a thin film of the lubricating liquid between the respective side plate and confronting side of the gear.

These side plates, as articles of manufacture, are inexpensive to produce, since ordinary milling and other types of machinery may be used to produce the keyway-like cross passageway 66, the radial passageway 67 or the radial grooves 68 and 69. All, being of the same size and pattern, for a given size pump, facilitates carrying an adequate supply of replacement side plates 60 in stock; the locating of each plate in operative relation to parts of the pump, so that one or the other of the grooves 68 or 69 will provide lubrication at the sides of the pump gears; and the locating of the side plates in a manner that of each pair of companion side plates at any given side of the companion pumping gears, there is assurance that the passageways 66 and 67 thereof will have adequate communication between the intake or suction side of the pump and the bearing chambers.

At all times during operation, the outboard end of the drive shaft 14 will only be subjected to suction pressure. In most pumps of a size having a pumping capacity of from say 16 to 370 gallons per minute, the suction pressure is low and thus the small end thrust will be adequately carried by the large bearing surface beyond the face of the driving gear 11 at the side plate 60. Solidification of viscous liquids is eliminated, because the liquid leaks back through the movable parts of the anti-friction bearings 32, 33, 47 and 48, which are in constant motion during operation of the pump.

I claim:

As an article of manufacture, a generally annular side plate, for surrounding the shaft of a pumping gear of a pump of the intermeshed gear type and for location at the side of the pumping gear, the plate having opposite parallel side faces, either of which may be disposed in confronting relation with the side of the gear; a central bore for the gear shaft; a flat chordal peripheral surface for engagement with a like surface of a companion generally annular plate, which chordal surface may be disposed in the zone of the area of meshing of the pumping gears; parallel, radial grooves open to said opposite side faces, to said bore and to the annular periphery of the plate adjacent to one end of said chordal peripheral surface; a cross passageway open to the bore and to said opposite side faces; and, a radial passageway open at one of said side faces, to said cross passageway, and to the annular periphery of the plate adjacent to the other end of said chordal peripheral surface.

References Cited in the file of this patent

UNITED STATES PATENTS

| | | |
|---|---|---|
| 1,372,576 | Tullmann | Mar. 22, 1921 |
| 1,379,587 | Fisher | May 24, 1921 |
| 2,082,412 | Morton | June 1, 1937 |
| 2,391,577 | Larson | Dec. 25, 1945 |
| 2,420,622 | Roth et al. | May 13, 1947 |
| 2,472,031 | Wichorek | May 31, 1949 |
| 2,487,732 | Schanzlin | Nov. 8, 1949 |
| 2,527,941 | Lauck et al. | Oct. 31, 1950 |
| 2,540,235 | Berkley | Feb. 6, 1951 |
| 2,665,641 | Lauck | Jan. 12, 1954 |
| 2,682,836 | Orr | July 6, 1954 |
| 2,695,566 | Compton | Nov. 30, 1954 |
| 2,707,441 | Drennen | May 3, 1955 |